Sept. 11, 1934.  F. SCHRÖTER  1,973,296

BROADCASTING SYSTEM USING ULTRASHORT WAVES

Filed April 5, 1930

INVENTOR
FRITZ SCHRÖTER
BY
ATTORNEY

Patented Sept. 11, 1934

1,973,296

UNITED STATES PATENT OFFICE 1,973,296

BROADCASTING SYSTEM USING ULTRA-SHORT WAVES

Fritz Schröter, Berlin, Germany, assignor to Telefunken Gesellschaft für Drahtlose Telegraphie m. b. H., Berlin, Germany, a corporation of Germany Application April 5, 1930, Serial No. 441,975
In Germany April 24, 1929

6 Claims. (Cl. 250—11)

The object of the present invention is to provide a method of and apparatus for acoustic and optical broadcasting wherein there are utilized waves of an order of one meter or decimeter, said wave energy being quasi-optical in nature. Since the propagation of these waves is rectilinear, the range of the radiator is confined to its optical visibility. The invention is based upon this fact and it discloses ways and means adapted to economically utilize a broadcasting station operating within the said wave-length range.

The chief idea resides in largely precluding radiation outside the cone or solid angle defined by the connecting lines and the horizon so that such energy as is radiated will be confined and limited to the useful solid angle, this being made possible by the fact that waves of one meter or one decimeter length can be concentrated into sharp beams by structures of limited dimensions and low cost of plant. The arrangements required for carrying the idea into practice, fundamentally speaking, are the same as for longer waves and directional radiation; for instance, they may consist of a plurality of dipoles fed under proper phase relations. In the case of waves of an order of one decimeter, it is more advantageous to have recourse to curved reflectors whose surfaces made from metal plate or gauze produce a concentrating or focusing action satisfying the laws of geometrical optics. The chief sense of radiation should generally be parallel to the horizontal line. The greater the altitude of the transmitter above the ground and above its surroundings, the more may the vector of maximum intensity be inclined in relation to the horizontal towards the earth, and the more favorable will become the angular distribution of the radiation attainable with limited means.

Figure 1:
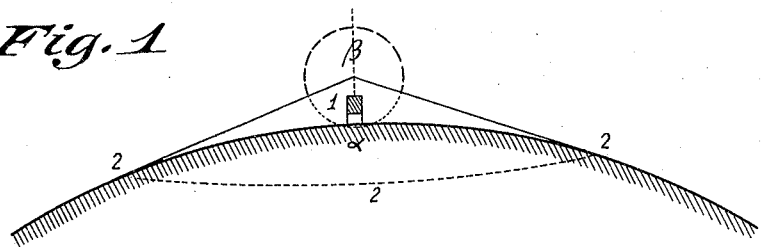
Figure 2:
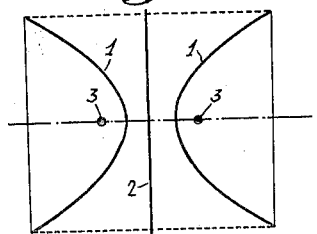
Figure 3:
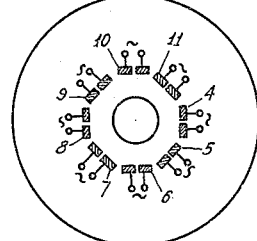
Figure 3:
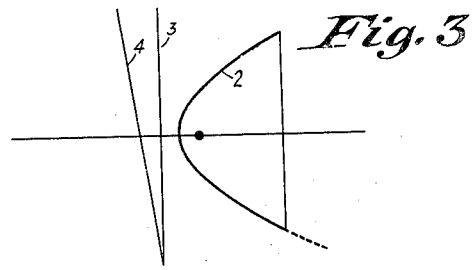

Fig. 1 shows the fundamentals of the method. 1 denotes the transmitter sending out radiations in all directions of the compass, 2 its geometric and optical horizon which at the same time limits the practical receiving range. According to this invention, the radiation is concentrated in the vertical section inside the solid angle or cone denoted by $\alpha$ so that, under ideal conditions, no energy is dissipated in the other solid angle designated by $\beta$. This is made possible by dipoles superposed in vertical sense and oscillating under co-phasic conditions in a way well known from short-wave work. However, for sending out shorter waves, say, of an order of one decimeter, a reflector 1, Fig. 2, presenting rotational symmetry may be used, said reflector being conceived as generated by rotating a parabola about its directrix 2 as axis. The focal line 3 of the said reflector is studded with a rim of dipoles fed with radio frequency energy, 4, 5, to 11, so that the desired radiation results in being fairly uniform in all directions, though being formed by a marked beam in vertical elevation. The outline of the beam in this section will be so much more precise, the wider the parabola embracing the radiators, and the greater therefore the aperture of the reflector. It is possible to mount a plurality of such transmitters above one another. If the dipoles are excited by means of spark-discharges (Hertz oscillators), there will be produced intermittent markedly damped wave-trains so that the chances of interference liable to result in undesirable directive actions, that is to say, zones of different field intensity in the receiving field of the transmitter will be, practically speaking, absent. Inclination of the vector of the chief radiation towards the horizontal line can be obtained by "de-focussing" the dipole radiators, though more advantageously, as shown in Fig. 3, by a reflector 1 which results by rotating parabola 2 about an axis 4 being slightly oblique in relation to its directrix.

Stations of the kind here disclosed may be received by means of non-directional, though more advantageously by the aid of directionally acting, receivers. In order that the incoming energy, apart from the use of condenser reflectors, may be further concentrated and intensified by further concentration of the outgoing radiations, recourse may be had in many instances to the production of a beam effect in the horizontal cross-sectional plane in addition to that in the vertical cross-sectional plane. This scheme has much to recommend itself, for instance, in cases where the transmitter is not situated in the center of the district to be served, but outside the same. In that case, transmission is substantially confined to the angle of vision formed between the territory in question and the origin of the radiation. But if the transmitting station is located at or near the center of the broadcasting zone, then supplementary bunching within the horizontal section is recommendable for the following reason: In the case of wave-lengths as here dealt with, it is difficult to increase the energy produced in the form of radio frequency in an oscillator tube or a spark-gap to any desired extent. On the other hand, paralleling of such generators and feeding the output thereof to an antenna giving off radiations in all directions is mostly prohibitive because of the conductor and tube capacities associated therewith.

Figure 4:
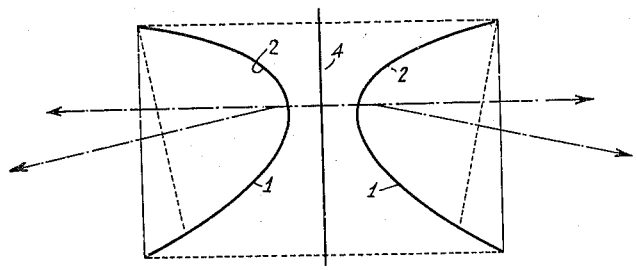
Figure 4:
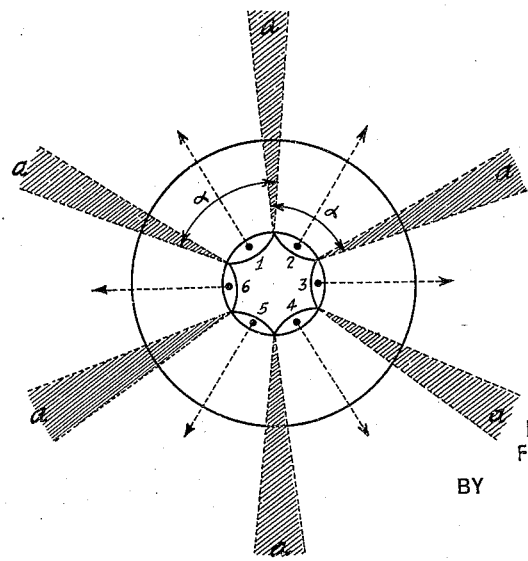

However, on account of the comparative simplicity and cheapness of plant and installation according to this invention, it would be altogether feasible from an economic viewpoint to mount a circle of transmitters 1, 2, 3, etc., as shown in Fig. 4, each one of which sending out a beam concentrated inside a certain angle $\alpha$. The result thus is a fan of beams, and the intensified aggregate energy thus given off all around results in correspondingly raised field intensities. If the undamped oscillations given off by the different radiators differ by certain frequency values, no danger of disturbing interference will be produced in the overlap zones $\alpha$. In this connection periodic frequency variations of relatively small value (wobbling so-called) may be produced.

The same practical result is obtained when the waves are subject to marked damping owing to spark generation. In that case also, no interference is noticeable, especially if the feed frequency of the spark-gap in turn is subjected to wobbling.

The distribution of the radiation density inside the angle of the beam is suitably so chosen that it will be greater in the vertical section in those cones which reach receiving points located at greater distances than for those incident in the neighborhood of the transmitter. In this manner, the receiving problem can be solved to greatest advantage from an economic viewpoint, and the quality of reception in the marginal regions reached by the transmitter will be improved.

I claim:

1. In an ultrashort wave broadcasting arrangement for propagating electromagnetic wave energy through space, said wave energy being quasi-optical in nature, the combination with a plurality of radiating units arranged substantially on a circle and at an appreciable height above the earth's surface, of reflecting means for said units arranged to concentrate the radiant energy within a cone formed by the point of transmission as an apex and a family of lines tangent to the earth's surface.

2. An arrangement for broadcasting over a wide angular sector electromagnetic waves of the order of one meter or less in wave length comprising a plurality of highly directional transmitter units emitting simultaneously beams of different waves of said order of magnitude each of said beams being within a relatively small angle, the sides of said angles being arranged to overlap, said units being placed adjacent one another and in such fashion that the simultaneously emitted beams are projected substantially inside the transmitter horizon and supplement each other so that a desired wide angular area has propagated through it electromagnetic wave energy of a wave length of said order of magnitude.

3. An arrangement for broadcasting over a wide angular sector electromagnetic waves of the order of one meter or less in wave length comprising a plurality of highly directional transmitter units arranged on a circle and emitting simultaneously beams of different waves of said order of magnitude each of said beams being within a relatively small angle, the sides of said angles being arranged to overlap, each of said units having a reflector and being placed adjacent to another in such fashion that the simultaneously emitted beams are projected substantially inside the transmitter horizon and supplement each other so that a desired wide angular area has propagated through it electromagnetic wave energy of a wave length of said order of magnitude.

4. An arrangement for broadcasting over a wide angular sector electromagnetic waves of the order of one meter or less in wave length, comprising a plurality of directional transmitter units, emitting simultaneously beams of waves of said order of magnitude, each of said beams covering an angle less than a right angle, the sides of said angles being arranged to overlap, said units being spaced adjacent one another and in such fashion that the simultaneously emitted beams are projected substantially inside the transmitter horizon and supplement each other so that a desired wide angular area has propagated through it electromagnetic energy of a wave length of said order of magnitude.

5. An arrangement for broadcasting over a wide angular sector electromagnetic waves of the order of one meter or less in wave length, comprising a plurality of directional transmitter units, emitting simultaneously a fan of beams of waves of said order of magnitude, each of said units emitting a beam of waves covering a well defined angle, said units being placed adjacent one another and in such fashion that the simultaneously emitted waves are projected substantially inside the transmitter horizon and supplement each other so that a desired wide angular area has propagated through it electromagnetic energy of a wave length of said order of magnitude.

6. In an ultrashort wave transmitter arrangement for propagating electromagnetic wave energy through space, said wave energy being quasi-optical in nature, the combination with a plurality of radiating units arranged substantially on a circle and above the earth's surface, each of said units emitting a beam of ultrahigh frequency waves covering an angle less than a right angle, of reflecting means for said units arranged to concentrate the radiant energy substantially within a cone formed by the point of transmission as an apex and a family of lines tangent to the earth's surface.

FRITZ SCHRÖTER.